Figure 1:
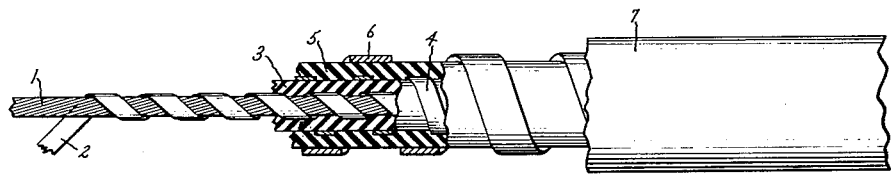

Jan. 1, 1952  D. C. SPOONER, JR  2,581,213
TEMPERATURE RESPONSIVE SIGNALING
AND LOCATING SYSTEM
Filed Dec. 15, 1949

Inventor:
David C. Spooner Jr.,
by *Sheridan's Diggs*
His Attorney.

Patented Jan. 1, 1952

2,581,213

UNITED STATES PATENT OFFICE 2,581,213

TEMPERATURE RESPONSIVE SIGNALING
AND LOCATING SYSTEM

David C. Spooner, Jr., Westport, Conn., assignor to General Electric Company, a corporation of New York Application December 15, 1949, Serial No. 133,139

6 Claims. (Cl. 177—311)

This invention relates to improved means for indicating the presence and approximate location of a significant change of ambient temperatures.

Among the objects of my invention are to provide a reliable heat sensitive system for automatically indicating and locating a significant temperature change at locations remote from a reference station, said system being inexpensive to install and to maintain in operation; to provide a system responsive to high temperature conditions, utilizing a highly flexible electrical cable embodying a thermosensitive material which will condition an alarm and indicating circuit for operation before the cable temperature reaches a level destructive of the cable or the thermosensitive material thereof; to provide an improved temperature-responsive cable which adapts itself to conventional junction box connection and therefore may easily be extended to additional rooms or areas and damaged cable sections readily replaced; and to provide means whereby a significant temperature change in any portion of the thermosensitive cable conditions an electric circuit which will operate means indicating the cable length between the indicator and the temperature change location, or otherwise suitably identify said location.

In a presently preferred method of practicing my invention for the detection of high temperatures, as in fire alarm systems, I utilize a thermosensitive cable generally as described and claimed in application Serial No. 91,396, which Milton S. Greenhalgh and I filed jointly on May 4, 1949, for "Thermosensitive Device and Apparatus Incorporating the Same," and assigned to my present assignee. Said cable comprises paired conductors which are maintained in uniformly spaced, insulated, relationship by a flexible organic material having a negative temperature-resistance coefficient; for example, said material may be the long chain polyamide known generically as nylon. Such material is an insulator at ordinary atmospheric temperatures but at elevated temperatures below its softening or disintegration point exhibits sufficient changes in direct or alternating current resistance, impedance, or the like, to conduct significant current at moderate potential levels. In association with said cable—for example, by a conductor applied thereover and insulated by any suitable conventional insulating material—I utilize a third conductor of relatively low resistance and arrange the said three conductors in a voltage measuring circuit. Upon the attainment of a sufficiently high temperature anywhere along the length of the cable the conduction of curent through the organic material separating the first two named conductors completes the measuring circuit, and the deflection of the meter needle or the like indicates the presence of the abnormal condition. The voltmeter scale may be calibrated either empirically or by calculation to read in terms of cable length from the material to the high temperature point or, assuming the cable to be run through various rooms of a building, storage bins, or spaces in a ship, may locate the high temperature condition by reference to such rooms or spaces.

In association with the voltage measuring circuit I may employ a relay to energize a visual or audible signal which will call attention to the existence of the high temperature condition.

It is contemplated that the temperature sensitive cable may be run exposed through the rooms or building spaces, or run through the conduits or the like housing the regular electric lighting or other electrical services in the building. An advantage of running the thermosensitive cable through lighting conduits or the like derives from the fact that the system then becomes indicative of temperature rises accompanying electrical overloads, and since electrical wiring is normally very thoroughly distributed throughout a residence or other building, a high temperature condition at any of a multiplicity of places within the building may be detected.

Figure 2:
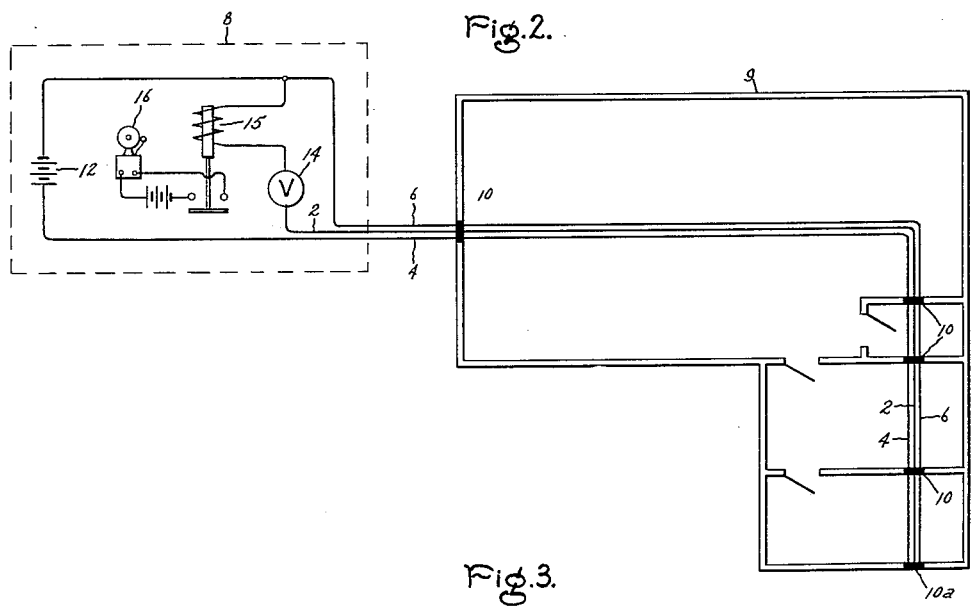
Figure 3:
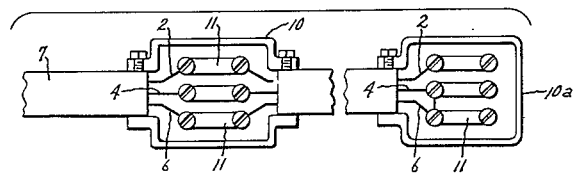

In the accompanying drawing, Fig. 1 shows a manner in which the thermosensitive cable used in my invention may be constructed; Fig. 2 is a somewhat schematic representation of a signalling and identification circuit, the cable of Fig. 1 being represented as three individual conductors running in parallelism through various rooms or spaces of a building or the like; and Fig. 3 represents a manner of connecting successive lengths of cable at junction boxes and indicates that at the end of the cable run two of the conductors thereof are connected together in the voltage measuring circuit.

The electric cable of Fig. 1 may comprise a stranded core 1 of glass fibres or the like flexible insulation material, about which is wrapped a ribbon-like conductor 2. Disposed about said conductor is a layer 3 of an organic insulation material which provides a tenacious, normally insulating, film having a thickness, for example, of the order of .010 inch. Wrapped about said layer to tightly embrace the same, and being held thereby in a substantially uniform spaced relationship with respect to the inner conductor 2, is a second conductor 4. The structure to this stage may be the same as shown in the aforesaid application Serial No. 91,396. The organic layer may be of nylon of the composition identified by the manufacturer, E. I. du Pont de Nemours and Company, as FM3604. Said nylon has a negative temperature-resistance coefficient such that at ordinary room temperature it is highly resistant to electrical conduction but at temperatures ranging above 250° F. its direct and alternating current resistance, and its impedance, drops to such a level that significant current, at moderate potential, may be conducted from one to the other of the conductors through the nylon layer. Three hundred degrees F. may be considered to be a practical upper limit of temperature because above said temperature the nylon begins to soften or otherwise deteriorate. For substantially higher temperatures, glass may be used as the insulation layer. The glass may be applied in spun or woven form, it being understood that the conductors 2 and 4 are in intimate contact therewith and maintained thereby in uniform spaced relation.

Although those skilled in the art will recognize that a voltage measuring circuit may be established with conductors 2 and 4 only by running the temperature-sensitive wire in such fashion that it completes a "loop" by returning to the voltmeter station, I prefer to utilize a third conductor which serves simply as a return wire. Accordingly, I apply about conductor 4 a layer 5 of suitable insulation material and wrap on said layer the third conductor 6. Applied about conductor 6 is any suitable insulation 7.

The cable structure of Fig. 1 possesses a high order of flexibility and is capable of withstanding repeated bending stresses without failure. It will be understood that the return conductor 6, instead of being arranged as shown, might comprise an individually insulated conductor lashed or otherwise associated with the thermosensitive conductors to run parrallel therewith.

The schematic representation of Fig. 2 shows the conductors of Fig. 1 as three individual parallel wires running from a control panel or station 8 through various spaces of a building or the like 9 under attention. The building has been represented as having a plurality of rooms, said representation merely typifying any enclosed space in which it is desired to detect and identify isolated conditions of high ambient temperature. My invention may serve as a fire alarm system in a building or the holds or other spaces of a ship for example, but in other feasible installations the thermosensitive cable may be run through piles of coal or other combustible material to respond to possible spontaneous combustion temperatures therein, or through piles or bins of grain or the like to indicate the attainment of temperatures which may be detrimental thereto. The cable of Fig. 1 lends itself to sectionalized interconnection as by bringing the ends of each cable length into suitable junction boxes 10, see Fig. 3, having connection strips 11 for the interconnection of the respective cable runs. Such junction boxes adapt the system to the immediate and inexpensive replacement of any cable section which may have been damaged or become ineffective. The final junction box of the run, designated 10a in Fig. 2, affords convenient means for interconnecting the return conductor 6 and one of the other conductors, such as conductor 4. Said conductors are continuously connected across the potential source 12. Conductor 6 is desirably of low resistance, but conductor 4 must necessarily be of high resistance in view of the disposition of said conductors in a closed circuit.

The potential source 12 should provide a constant level of potential, which may be alternating or direct current according to the energy available. Voltmeter 14 and relay 15 of a type suitable to the potential, are connected across conductor 6 and the open ended conductor 2. Relay 15 may be connected in parallel across the voltmeter as an alternative to the illustrated series connection. Voltmeter 14 should be highly sensitive, and preferably would be of a suitable vacuum tube type. It will be readily evident that so long as the insulating layer 3 is at the temperatures at which it may be considered as an insulator, no circuit is completed through the voltmeter and relay. If at any point along the length of the cable run the ambient temperature becomes so high as to bring the layer 3 to its conducting temperature level the conduction between conductors 2 and 4 will complete the voltmeter circuit and the meter will respond according to the voltage drop between the meter and the conduction location of the temperature-sensitive layer 3. Concurrently, relay 15 which is of a suitable sensitive type, will respond to the current flow to energize a visible or audible signal 16 to call attention to the abnormal circuit condition.

The relay may be of the lock-in type so that the signal will continue to be energized even though the thermosensitive cable be burned out or otherwise completely destroyed. Similarly the voltmeter needle may of the maximum deflection type which will hold its deflected position even though the energizing circuit is destroyed as aforesaid. The voltmeter scale may advantageously be calibrated in terms of linear feet of cable run between the voltmeter and the high temperature location, or may actually identify the room or space in which the dangerous condition exists. Such calibration may be made after installation by applying heat to the cable at various known or identifiable locations. Such a calibration system would allow for nonuniform resistance of the respective conductors.

I consider that my invention affords substantial practical advantages of economy and simplicity as respects contemporary fire alarm systems involving a plurality of thermostat circuits or fusible links in that a single, small diameter cable may be run throughout the spaces to be protected and function reliably to indicate not only the presence of a hazardous condition, but the approximate location thereof. The response of the thermosensitive material is such that if the condition producing actuation were corrected promptly enough, the alarm system would be self-restoring.

While I have shown a particular embodiment of my invention, it will be understood, of course, that I do not wish to be limited thereto since many modifications may be made; and I therefore contemplate by the appended claims to cover any such modifications as fall within the true spirit and scope of my invention.

What I claim as new and desire to secure by Letters Patent of the United States is:

1. In an overheat detection and locating system including an electrical measuring instrument at a signal station, a sectional signal cable comprising first and second coextensive signal conductors, a thin flexible layer of thermoplastic material in surface contact with both of said signal conductors and maintaining said signal conductors in uniform spaced relation, said material being an electric insulator at one temperature and having a negative temperature-resistance characteristic such that conduction of electric current of control magnitude occurs at a predetermined high temperature without substantial physical and chemical change in said material, a coextensive return conductor of relatively low resistance per unit length, at least one terminal block adapted to interconnect the three conductors of one cable length with corresponding conductors of another cable length, said terminal block at the remote end of the system from the signal station including means interconnecting one of said signal conductors with said return conductor to provide a closed electrical conducting loop extending through the entire area under protection and resulting in a measurable potential gradient along said one signal conductor when a constant voltage is impressed on said loop, said electrical measuring instrument being connected across said return conductor and the other of said signal conductors to measure the distance along the cable to the point of conduction through said thermoplastic material on occurrence of said predetermined high temperature.

2. Means according to claim 1, in which the thermoplastic material is a nylon.

3. Means according to claim 1, in which the thermoplastic material is glass.

4. An over-temperature detecting and locating system comprising a conductor core, a thin and substantially uniform layer of organic material in intimate surface contact with said core conductor, said material being an electric insulator at normal ambient temperatures and at a predetermined high temperature becoming a conductor of electric current of control magnitude at domestic voltage levels without substantial physical change, an encircling conductor on said layer and in intimate surface contact therewith, an insulated power return conductor coextensive with said first two conductors, means connecting said power return conductor in series with one of said other conductors at an end remote from a control station to form a closed electrical conducting loop and provide a potential gradient along said one other conductor when a substantially constant voltage is impressed across said loop, and an electrically operated indicating instrument calibrated in terms of conductor length connected across said return conductor and the remaining conductor.

5. A cable system for detecting and locating an overheat condition comprising a conductor core, a thin and substantially uniform layer of organic material in intimate surface contact with said core conductor, said material being an electric insulator at one temperature and having a negative temperature-resistance characteristic such that conduction of electric current of control magnitude occurs through said layer at a predetermined high temperature without substantial physical and chemical change in said material, an encircling conductor on said layer in intimate surface contact therewith and coextensive with said core conductor, a power return conductor coextensive with and insulated from said first two conductors, and means connecting said power return conductor in a closed electrical conducting loop with one of said other conductors at an end of the cable remote from a control station.

6. Means according to claim 5 in which the organic material is a thermoplastic.

DAVID C. SPOONER, Jr.

REFERENCES CITED

The following references are of record in the file of this patent:

UNITED STATES PATENTS

| Number | Name | Date |
| --- | --- | --- |
| 1,152,932 | Caldwell | Sept. 7, 1915 |
| 2,018,499 | Lindsey | Oct. 22, 1935 |
| 2,420,481 | Jackson et al. | May 13, 1942 |
| 2,423,537 | Wheeler | July 8, 1947 |
| 2,477,348 | Postal | July 26, 1949 |
| 2,495,867 | Peters | Jan. 31, 1950 |